United States Patent
Lohberg et al.

(10) Patent No.: US 8,368,388 B2
(45) Date of Patent: Feb. 5, 2013

(54) ARRANGEMENT FOR WHEEL ROTATIONAL SPEED DETECTION WITH INCREASED INTRINSIC SAFETY

(75) Inventors: Peter Lohberg, Friedrichsdorf (DE); Wolfgang Fritz, Großen-Linden (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 636 days.

(21) Appl. No.: 11/989,849

(22) PCT Filed: Aug. 1, 2006

(86) PCT No.: PCT/EP2006/064891
§ 371 (c)(1),
(2), (4) Date: Mar. 26, 2008

(87) PCT Pub. No.: WO2007/014947
PCT Pub. Date: Feb. 8, 2007

(65) Prior Publication Data
US 2010/0090690 A1    Apr. 15, 2010

(30) Foreign Application Priority Data

Aug. 1, 2005   (DE) .......................... 10 2005 036 614
Aug. 1, 2006   (DE) .......................... 10 2006 036 197

(51) Int. Cl.
*G01P 3/00* (2006.01)
(52) U.S. Cl. .................................. 324/174; 324/207.25
(58) Field of Classification Search .................... 324/174
See application file for complete search history.

(56) References Cited

U.S. PATENT DOCUMENTS 5,568,048 A * 10/1996 Schroeder et al. ....... 324/207.21
(Continued)

FOREIGN PATENT DOCUMENTS

DE    19618509    11/1996
DE    19906937    9/2000
(Continued)

OTHER PUBLICATIONS

International Search Report dated Nov. 13, 2006 for Application No. PCT/EP2006/064891.
Translation of Written Opinion for Application No. PCT/EP2006/064891.

*Primary Examiner* — Patrick Assouad
*Assistant Examiner* — David M. Schindler
(74) *Attorney, Agent, or Firm* — Carlson, Gaskey & Olds, P.C.

(57) ABSTRACT

Disclosed is an arrangement for the intrinsically safe detection of movements of a body, such as a wheel. The arrangement includes a magnetic encoder (5, 25) and a sensor (26), the magnetic encoder (5, 25) moving with the body and is magnetically coupled to at least two sensor elements (S1, S2) of the sensor (26) via a magnetic air gap. The sensor (26) has at least two mutually separate signal paths (S1, f1; S2, f2) which have at least one of the sensor elements (S1, S2) and a signal conditioning stage (28, 29). A primary measuring signal path (S1, f1) is constructed so that during normal operation represents an output signal the basic frequency of the encoder movement or the temporal profile of the output signal have patterns. The temporal occurrence of the patterns correspond to the basic relative speed between the sensor (26) and the pole pairs of the encoder (5, 25) which are detected by the sensor.

10 Claims, 11 Drawing Sheets

U.S. PATENT DOCUMENTS

| | | | | |
|---|---|---|---|---|
| 5,998,989 A * | 12/1999 | Lohberg | ........................ | 324/174 |
| 6,417,662 B1 * | 7/2002 | Wallrafen | ...................... | 324/174 |
| 7,084,619 B2 * | 8/2006 | Butzmann | ..................... | 324/165 |
| 7,714,570 B2 * | 5/2010 | Thomas et al. | ............. | 324/207.2 |
| 2004/0100251 A1 * | 5/2004 | Lohberg | ........................ | 324/166 |
| 2004/0217754 A1 * | 11/2004 | Shirai et al. | ................... | 324/166 |
| 2005/0179429 A1 * | 8/2005 | Lohberg | ................... | 324/207.13 |

FOREIGN PATENT DOCUMENTS

| | | |
|---|---|---|
| WO | 01/51893 | 7/2001 |
| WO | WO 03087845 A2 * | 10/2003 |
| WO | 2004/003478 | 1/2004 |

\* cited by examiner

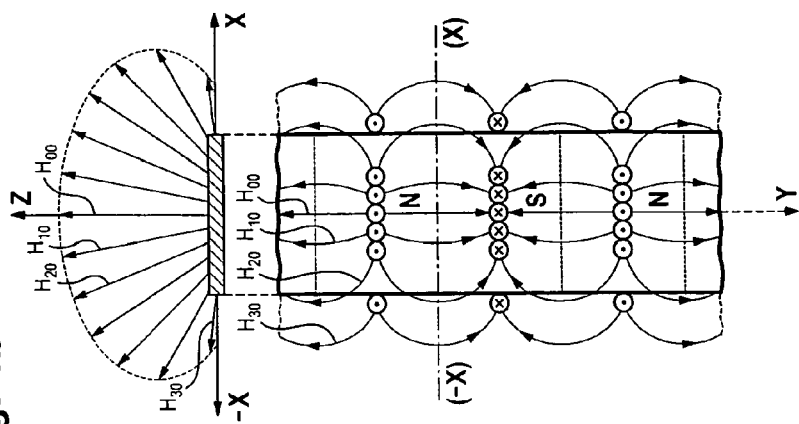
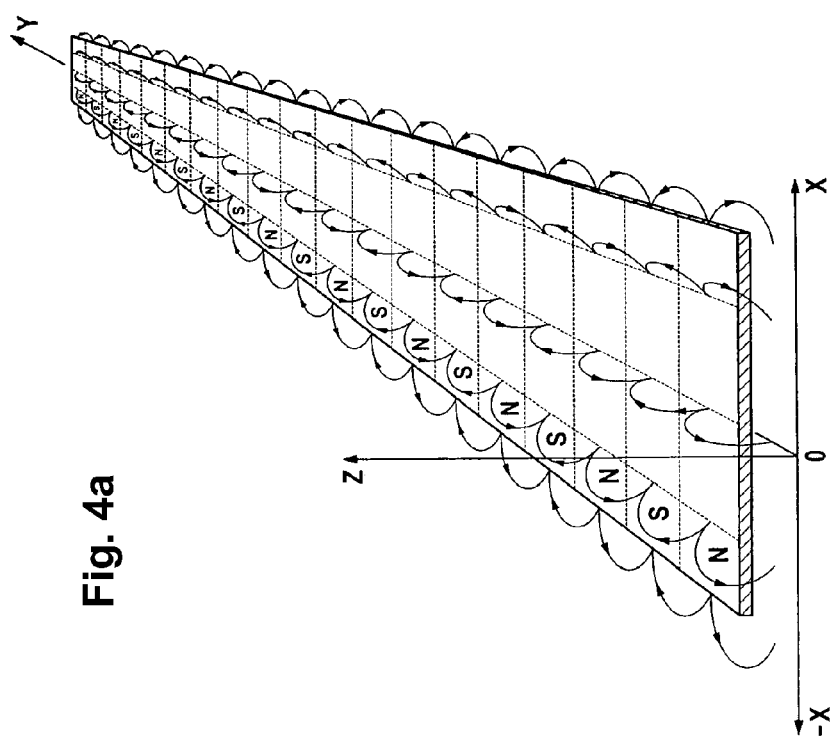
Fig. 4a
Fig. 4b $$\frac{\Delta R}{\Delta R_{MAX}} = \left[ \cos^2\alpha - \cos 2\alpha \cdot \left(\frac{H_y}{H_x+H_0}\right)^2 + \sin 2\alpha \cdot \left(\frac{H_y}{H_x+H_0}\right) \cdot \sqrt{1 - \left(\frac{H_y}{H_x+H_0}\right)^2} \right]$$

$$\frac{\Delta R}{\Delta R_{MAX}} = \frac{1}{2}\left[1 - \text{Cos2}\left(2\pi\frac{Y}{\lambda}\right)\right]$$

ARRANGEMENT FOR WHEEL ROTATIONAL SPEED DETECTION WITH INCREASED INTRINSIC SAFETY

BACKGROUND

This disclosure relates to a method for increasing the intrinsic safety of an arrangement for rotational speed detection and/or for the intrinsically safe detection of linear and/or rotational movements of a body, in particular of a wheel, the arrangement comprising a magnetic encoder (5, 25) and a sensor (26). The sensor (26) having at least two sensor elements (S1, S2) which are magnetically coupled to the magnetic encoder (5, 25). The arrangement providing for the intrinsically safe rotational speed detection and/or for the intrinsically safe detection of linear and/or rotational movements of a body, such as a wheel, and to the use of the method and/or of the arrangement in motor vehicles.

It is known to detect the rotational speed of a wheel by means of a sensor arrangement having a magnetic encoder, which rotates with the wheel, and at least one magnetic-field-sensitive sensor, the magnetic encoder being magnetically coupled to the magnetic-field-sensitive sensor via a magnetic air gap.

Sensors, in particular active sensors, based on magnetoresistive effects are used in industry, and particularly often in the motor vehicle industry, owing to their robustness and good signal quality. These good signal properties are ensured, moreover, for example by complying with the tolerances of a specified relative position between encoder track and sensor, in particular the sensor element/elements thereof, upon installation or upon mounting of the sensor. If, by way of example, the tolerances are not complied with as a result of lateral relative offset and a situation of excessively great proximity (excessively small air gap length or excessively strong transverse components of the encoder field strength), signal disturbances can occur which temporarily or permanently alter the sensor output signal in an impermissible manner. The profile of the output signal then no longer corresponds precisely to the movement profile of the pole pairs of the encoder track, rather there typically occur sporadic or permanent frequency multiplications and/or frequency fluctuations, in particular frequency doublings, which can for example also occur in the case of the wheel rotational speed sensors of motor vehicles. In order to avoid such disturbing frequency doublings or frequency multiplications, suitable final acceptance tests are carried out. In order to be able to react appropriately to such phenomena during operation, usually complicated plausibility calculations are carried out. These errors can also become apparent and even be amplified in the course of further signal processing.

Document DE 199 06 937 A1 proposes a rotational speed sensor, the angular pitch of the encoder being coarser than the angular resolution of the rotational speed sensor, and the rotational speed sensor having two magnetic field sensors which are arranged separately from one another and which generate two measurement signals which are phase-offset relative to one another and which are combined in such a way that the output signal has an increased frequency relative to the measurement signals for the purpose of achieving the necessary measurement resolution. Such a rotational speed sensor serves principally for improving the resolution. However, no improvement is achieved with regard to the intrinsic safety of the rotational speed sensor.

The present disclosure includes a method for increasing the intrinsic safety of an arrangement for the rotational speed detection and/or for the intrinsically safe detection of linear and/or rotational movements of a body, in particular of a wheel, and a corresponding arrangement.

The a disclosed method provides for increasing the intrinsic safety of an arrangement for detecting linear and/or rotational movements of a body, in particular of a wheel. The arrangement comprising a magnetic encoder (5, 25) and a sensor (26) with the sensor (26) having at least two sensor elements (S1, S2) which are magnetically coupled to the magnetic encoder (5, 25). The arrangement further provides for the intrinsically safe detection of linear and/or rotational movements of a body, in particular of a wheel, comprising a magnetic encoder (5, 25) and a sensor (26), the magnetic encoder (5, 25) moving and/or rotating with the body, in particular the wheel, and being magnetically coupled to at least two sensor elements (S1, S2) of the sensor (26) via a magnetic air gap.

SUMMARY

This disclosure is for a method and apparatus for increasing the intrinsic safety of an arrangement for wheel rotational speed detection and/or an arrangement for the detection of movements of a wheel or of some other rotating, body. In this case, an example arrangement has a magnetic encoder and a sensor having at least two sensor elements. The magnetic encoder moving and/or rotating with the body, in particular with the wheel, and being magnetically coupled to the at least two sensor elements of the sensor via a magnetic air gap. Moreover, the sensor has at least two mutually separate, signal paths which comprise in each case at least one of the sensor elements and in each case a signal conditioning stage. In this case, at least one primary measuring signal path is present and constructed in such a way that its at least one output signal, in particular the temporal profile of its at least one output signal, during normal operation represents the basic frequency of the movement of the pole pairs of the encoder, the movement being detected by the at least one sensor element such that the temporal profile of its at least one output signal during normal operation includes patterns. The temporal occurrence of the patterns essentially corresponding to the basic relative speed between the sensor and the pole pairs of the encoder which are detected by the sensor such that its one or more output signals represent in particular a measure of the basic wheel rotational speed. In addition at least one observing signal path is present and constructed in such a way that its at least one output signal, in particular the temporal profile of its at least one output signal, represents the doubled frequency of the movement of the pole pairs of the encoder. The movement being detected by the at least one sensor element such that the temporal profile of its at least one output signal during normal operation have patterns. The temporal occurrence of the patterns essentially corresponding to the doubled relative speed between the sensor and the pole pairs of the encoder which are detected by the sensor such that its one or more output signals represent in particular a measure of the doubled wheel rotational speed. The disclosed arrangement is suitable, in particular, for identifying disturbances which impair normal operation, and particularly preferably reacting to them.

The disturbances or disturbing effects include very particularly preferably frequency multiplications and in particular frequency-doubling effects and/or preferably effects which are described as "flipping" hereinafter.

The disclosed arrangement is provided for carrying out the method in accordance with the claims.

Magnetic-field-sensitive, in particular active, sensors are used according to the invention. Active sensors are known, in particular for the motor vehicle sector. They exist in 2-wire embodiment and in 3-wire embodiment. By way of example, embodiments are described on the basis of the 2-wire embodiment such as is customary for braking systems. However, it is within the scope of the invention also to apply the basic concept to 3-wire embodiments that are widespread, e.g. in motor and/or gear mechanism applications.

A sensor element is understood to be a magnetic-field-sensitive sensor element based on one of the various magnetoresistive effects, in particular the anisotropic magnetoresistive effect or the giant magnetoresistive effect. Preferably, an electronic circuit, in particular integrated into the sensor to form the sensor element, converts the resistance changes resulting from the changing magnetic field detected by the sensor into two different current levels which, as output signal themselves or part of a more complex output signal, map the succession of e.g. tooth height and tooth gap or north pole and south pole. Particularly preferably, the arrangement for intrinsically safe rotational speed detection has at least two sensor elements, in which case it is possible to combine different sensor elements in the context of the arrangement. Sensor elements preferably comprise at least partial bridge circuits of these magnetoresistive striplines.

A magnetic encoder is understood to be a machine element carrying an, in particular incremental, magnetically encoded angle scale and/or length scale. Ferromagnetic gearwheels and/or toothed racks or perforated disks and/or perforated rods which, in combination with a permanent magnet, produce a variable magnetic air gap can also serve as encoders. On the other hand, there may be magnetic encoders which have an encoder track with a magnetically encoded pattern; in particular, such a pattern may be an integral sequence of permanently magnetized north/south pole areas which, in an alternating sequence, form an encoder track which extends essentially straight or is closed to form a circle and which is introduced into a wheel bearing seal, for example. In particular, the magnetic encoder serves as a pulse transmitter within the rotational speed detection system and/or the arrangement for rotational speed detection.

The electronic control unit (ECU) is preferably understood to be the electronic control unit of a motor vehicle regulating system, in particular a network of microcontrollers which processes programs and data communication jointly, in particular in distributed fashion. It is alternatively expedient for the electronic control unit (ECU) to be an, in particular simple, evaluation unit, particularly preferably for driving a lamp, or alternatively particularly preferably an industrial microprocessor system and/or an electronic circuit for control and/or regulation.

Normal operation is understood to mean the operation of at least one sensor element during which no significant disturbing variables disturb the detection of the movement and/or rotation of the encoder and, consequently, no significant disturbances occur in the at least one output signal of the at least one sensor element. This relates, in particular, to disturbances with regard to the frequency of the at least one output signal. In this case, the temporal profile/profiles of the at least one output signal of the at least one sensor element have patterns, the temporal occurrence of said patterns in such disturbance operation that deviates from normal operation corresponding to a multiple and/or a fluctuating multiple, in particular a doubling, of the relative speed between the sensor and the pole pairs of the encoder which are detected by the sensor. The occurrence of the patterns, which does not correspond to the relative speed between the sensor and the pole pairs detected by the latter, can occur momentarily and/or sporadically, and/or continuously to a more or less pronounced extent, in particular as a signal superposition. Such disturbing effects are referred to for example as frequency fluctuations, frequency multiplications or frequency doublings. These disturbances may be based on effects, and/or referred to as such, which are referred to as "flipping". This preferably involves, on the one hand, disturbances resulting from the relative position between sensor and encoder. Thus, sensor elements for detecting movements are often operated in such a way, in particular in the primary measuring signal path of the sensor arrangement according to the invention, that essentially only one direction component of the magnetic encoder field is detected and the movement information of the encoder is obtained from the change in this one direction component. In this case, the at least one sensor element is preferably oriented essentially perpendicular, centrally and with the measuring area of the sensor element essentially parallel to the surface of the encoder track. By contrast, angle measurements are often carried out in such a way that two direction components of the magnetic encoder field are detected, the at least one sensor element being oriented essentially perpendicular to the surface of the encoder track. Comparable behavior is also exhibited by a sensor element which is oriented essentially parallel to the surface of the encoder track, but is positioned essentially laterally or diagonally laterally with respect to the surface of the encoder track. In this case, the profile/profiles of the at least one output signal of the at least one sensor element corresponds/correspond to the doubled frequency of the movement of the encoder, which is regarded as disturbing particularly within the meaning of the invention. Disturbances which are referred to as "flipping" result in this connection from the above-described undesirable detection of two field components that change with the encoder movement, in which case this detection of a rotating vector can also take place proportionately and as a superposition, which is regarded as a disturbance as of a specific extent. On the other hand, disturbances which are also referred to as "flipping" result from the fact that the orientation of the internal magnetization of at least one stripline of at least one sensor element changes over and/or changes abruptly and/or continuously. Preferably, the striplines of magnetoresistive sensor elements have a direction of the shape anisotropy which is also the energetically most favorable and most stable direction of the internal magnetization. In the event of a changeover or inversion of the orientation of the component of the internal magnetization in the direction of the shape anisotropy, the characteristic curve of the sensor element is mirrored at the ordinate, which has an, in particular, frequency-doubling effect with regard to the output signal. Such a changeover ("flipping") of the orientation of the internal magnetization preferably takes place when the magnetic field applied by a supporting or biasing magnet is compensated for and/or reversed by an external magnetic field. The components of a magnetic field in the direction of the shape anisotropy (x direction) which have such an effect are preferably part of a magnetic disturbing field outside the sensor arrangement. In particular, these different effects referred to as "flipping" occur in combination, whereby the cause of the disturbance cannot be determined unambiguously. Particularly preferably, mention is made of "flipping" in any case when frequency-doubling disturbances occur in the output signals of sensor elements.

It is expedient for the output signal/signals of the at least one primary measuring signal path and of the at least one observing signal path to be compared in a comparator or a frequency comparator circuit. The comparison result is transmitted to the electronic control unit (ECU). This measure makes it possible to identify different signal profiles of the two signal paths and to identify the presence of a disturbance that has taken effect. The conditioned signals are transmitted directly to the ECU and compared there and the comparison is evaluated.

Additionally, other signal parameters such as the amplitude, for example, of the at least one output signal of the at least one primary measuring signal path and of the at least one observing signal path are compared in a comparator and evaluated and, the at least one evaluation result is transmitted to the electronic control unit ECU. In this case, by way of example, the amplitudes of the two half-bridge signals of the sensor element of the observing signal path are compared in order to obtain an item of information with regard to the relative positioning between the reading point of the full bridge of the sensor element and the center of the encoder track.

The at least one primary measuring signal path may be constructed and/or arranged in such a way as not to preclude a situation in which its output signal/signals represents/represent the doubled frequency and/or the temporal profile/profiles of its at least one output signal during normal operation has/have patterns, the temporal occurrence of said patterns essentially corresponding to the doubled relative speed between the sensor and the pole pairs of the encoder which are detected by the sensor. The at least one primary measuring signal path can thereby be designed in such a way that it normally affords a high measurement accuracy.

The at least one observing signal path is constructed and/or arranged in such a way that its output signal/signals, independently of the magnetic conditions in the air gap, independently of the position of the at least one sensor element of the at least one observing signal path relative to the encoder track, represents/represent the doubled frequency and/or that the temporal profile/profiles of its at least one output signal during normal operation has/have patterns, the temporal occurrence of said patterns, independently of the magnetic conditions in the air gap, in particular also independently of the position of the at least one sensor element of the at least one observing signal path relative to the encoder track, essentially corresponding to the doubled relative speed between the sensor and the pole pairs of the encoder which are detected by said sensor.

By virtue of this configuration, the at least one observing signal path reliably outputs a signal of doubled frequency, whereby undesirable frequency doublings of the at least one primary measuring signal path can always be identified.

It is expedient for the at least one output signal of the at least one sensor element, in particular of the sensor element/sensor elements of the at least one primary measuring signal path, to provide, alongside the information about the frequency, which, in particular, is proportional to the relative speed between sensor and encoder, additional information items, in particular about the direction of movement and/or air gap size. These additional information items afford possibilities for increasing the spectrum of use of the arrangement, or for adapting the arrangement flexibly to the respective use and integrating additional functions particularly with regard to the signal transmission.

Additionally, the output signals of the at least one primary measuring signal path and of the at least one observing signal path are compared with one another in the comparator continuously and/or at defined points in time. The comparator is designed such that if the frequencies represented by the output signals of the primary measuring signal path(s) and of the observing signal path(s), the frequencies being in particular proportional to the relative speed between sensor and encoder, and/or the temporal profile of the patterns representing the movement of the encoder essentially match, an erroneous function of the primary measuring signal path(s) is identified.

It is provided, by means of a suitable signal, that an item of information about the functional state of the primary measuring signal path paths, in particular together with the output signal(s) of the primary measuring signal path/paths, is transmitted to the electronic control unit (ECU), whereby the electronic control unit can react appropriately and particularly preferably carries out a shutdown of the arrangement. Very particularly preferably, this is done taking account of safety-relevant requirements, such that an erroneous signal and/or an error in the wheel rotational speed sensor of a motor vehicle cannot lead to a critical driving state.

It is expedient for the elements for signal conditioning and processing to be constructed as electronic circuits, in particular as part of at least one integrated circuit. This enables the arrangement to be realized in a relatively cost-effective manner.

The magnetic encoder may have a permanently magnetized encoder track comprising in particular alternating magnetic north-south poles, and for the sensor elements to utilize a magnetoresistive effect, particularly preferably the anisotropic magnetoresistive effect, and to be formed in particular as a combination of striplines composed of permalloy. These embodiments of encoder and sensor have proved to be very reliable. Moreover, on account of their being widespread, these products are readily available and relatively cost-effective.

The planes of the sensor elements are arranged essentially parallel to the plane of the encoder track (XY plane).

It is expedient that the sensor element/elements in the at least one primary measuring signal path is/are a half- or full-bridge combination of striplines, the striplines, in particular in each case, either if they have no Barber-poles, being oriented at an angle of essentially +45° or −45° with respect to the direction of movement of the encoder (Y axis), in particular also in a manner mirrored in a corresponding orientation with regard to the direction of movement of the encoder (Y axis), or if they are provided with Barber-poles, however, being oriented essentially perpendicular or parallel to the direction of movement of the encoder (Y axis). What is achieved thereby is that such sensor elements during normal operation map the movement speed of the encoder and/or the frequency with regard to the frequency of their output signals in a ratio of 1:1. In particular, said striplines function according to the anisotropic magnetoresistive principle. The direction indications with regard to the orientation of the striplines can also be considered with a tolerance of +/−15°, or the orientation of the striplines of the primary measuring signal path can deviate by as much as +/−15° with respect to orientations mentioned above, this covering manufacturing and installation tolerances, on the one hand, and also intentional changes with regard to the orientation.

The sensor element/elements in the at least one observing signal path is/are a half- or full-bridge combination of striplines, the striplines, in particular in each case, either if they have no Barber-poles, being oriented essentially parallel or perpendicular to the direction of movement of the encoder (Y axis), or if they are provided with Barber-poles, however, being oriented at an angle of essentially +45° or −45° with respect to the direction of movement of the encoder (Y axis), in particular also in a manner mirrored in a corresponding orientation with regard to the direction of movement of the encoder (Y axis). What is achieved by means of this arrangement and/or embodiment and orientation of the sensor elements, described by way of example for a rotating body, is that the output signals of said sensor elements always essentially correspond to the doubled frequency of the encoder. What is thereby achieved is that such sensor elements reliably map the movement speed of the encoder and/or the frequency with regard to the frequency of their output signals in a ratio of 1:2, whereby a frequency doubling therefore takes place through the sensor element. In particular, said striplines function according to the anisotropic magnetoresistive principle. The direction indications with regard to the orientation of the striplines can also be considered with a tolerance of +/−15°, or the orientation of the striplines of the observing signal path can deviate by as much as +/−15° with respect to orientations mentioned above, this covering manufacturing and installation tolerances, on the one hand, and intentional changes with regard to the orientation. The at least one observing signal path functions properly both during normal operation and outside normal operation (disturbance operation), in particular with regard to the frequency of its at least one output signal.

The at least two sensor elements of the two different signal paths are constructed and arranged in such a way that the angle between the current direction in each stripline of each sensor element of the primary measuring signal path and the field direction of the respective biasing magnet (x direction) is essentially 45°±n*90°, in particular with a tolerance of +/−15°, and the angle between the current direction in each stripline of each sensor element of the observing signal path and the field direction of the respective biasing magnet (x direction) is essentially n*90°, in particular with a tolerance of +/−15°.

It is expedient to provide the striplines with Barber-poles in order to achieve a linearization of the output signals with regard to a defined angle.

At least one supporting magnet is arranged perpendicular to the direction of movement of the encoder and to act in particular on the at least one sensor element of the at least one primary measuring and of the at least one observing signal path.

One or a plurality of the sensor element(s) are provided with a permanent magnet and/or a coil. An internal preferred direction of the magnetization is thereby predefined for the striplines, whereby likewise a linearization of the characteristic curve of the output signals can be achieved and a magnetic supporting field or biasing field is generated which makes such a sensor element relatively insensitive to a changeover/inversion of the orientation of the field component of the internal magnetization in the direction of the shape anisotropy.

It is expedient for the sensor elements of the different signal paths, in particular additionally with the elements for signal conditioning and processing, to be integrated on a common chip. Costs can thereby be reduced.

Furthermore, the disclosed method relates to a use and/or of the arrangement used in motor vehicles, in particular in at least one wheel rotational speed sensor system.

The described method and the arrangement according can be used in all areas in which the movements of bodies having magnetic encoders are detected by sensors. This concerns both the detection of linear movements and the detection of rotational movements and combination movements, for example the movement of a conveyor belt. Provision is preferably made for using the method according to the invention and the application according to the invention in automation technology, in particular in industrial applications, particularly preferably in robotics. In this case, this is advantageous in particular for increasing the intrinsic safety of an arrangement for rotational speed detection and in arrangements and/or systems for wheel rotational speed detection. In this case, the method according to the invention and the arrangement according to the invention, on account of their design for safety-critical applications, are very particularly preferably suitable for use in motor vehicles, in particular in wheel rotational speed detection systems of motor vehicles, motorcycles, trucks and trailers.

The sensor according to the invention that is contained in the arrangement is based either on a direct hardware embodiment, in which case the embodiment, in particular as an integrated circuit can be arranged on one or more chips. Moreover, the invention, in particular the sensor also relates to hardware structures which are driven and/or operated and/or connected up by the use of a software in such a way that equivalent modes of functioning and/or modes of behavior of circuits are generated and/or mapped by software means. In this case, the sensor or parts of the sensor, also very may relate to software which is suitable for the above-described equivalent mapping of circuits, in particular integrated circuits, on hardware structures suitable therefor such as PLDs (programmable logic devices) or FPGAs (field programmable gate arrays).

Further embodiments emerge from the following description of exemplary embodiments with reference to figures.

BRIEF DESCRIPTION OF THE DRAWINGS

In the figures, in schematic and exemplary illustration:

FIGS. 4a and 4b show the field line profile on an alternately magnetized scale.

DETAILED DESCRIPTION OF THE DRAWINGS

Figure 1A:
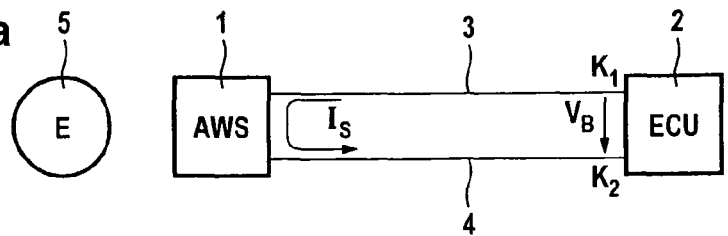
FIGS. 1a and 1b show wheel rotational speed detection systems in accordance with the prior art.
Figure 1B:
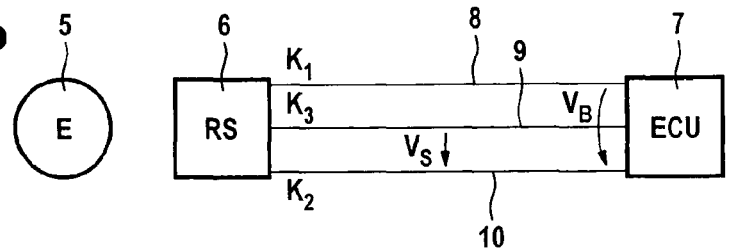

FIGS. 1a and 1b show by way of example two known arrangements for wheel rotational speed detection. In FIG. 1a, sensor 1 and electronic control unit ECU 2 of the motor vehicle regulating system (electronic controller of the ABS regulator) 2 are electrically connected to one another via a two-wire line 3, 4. An operating voltage VB is required for operation of the sensor, said operating voltage being provided by the ECU at the terminals K1, K2. Active sensor 1 is thus supplied with energy via the two-wire line 3, 4. Magnetic encoder 5 modulates the magnetic field surrounding it by virtue of its rotation, said magnetic field being detected by sensor 1. In this case, sensor 1 modulates the amplitude of the signal current depends on the encoder rotation, whereby the wheel rotational speed information items are transmitted in coded form to the ECU 2, and the wheel rotational speed information items are decoded again.

FIG. 1b shows another sensor 6, which is electrically connected to ECU 7 via a 3-wire line 8, 9, 10. Active sensor 6 also draws its energy from the ECU 7. Sensor 6 transmits the wheel rotational speed information items to ECU 7 by means of the voltage Vs present between lines 9, 10.

Figure 2A:
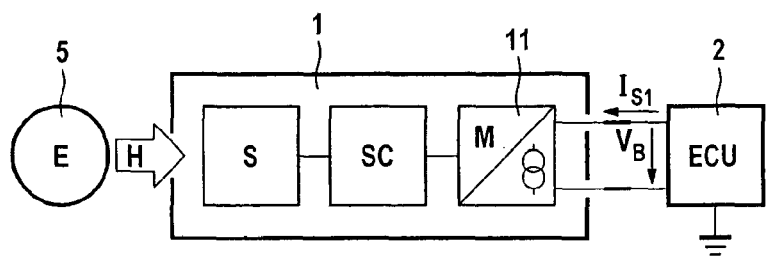
FIGS. 2a and 2b show the schematic construction of typical sensor modules.
Figure 2B:
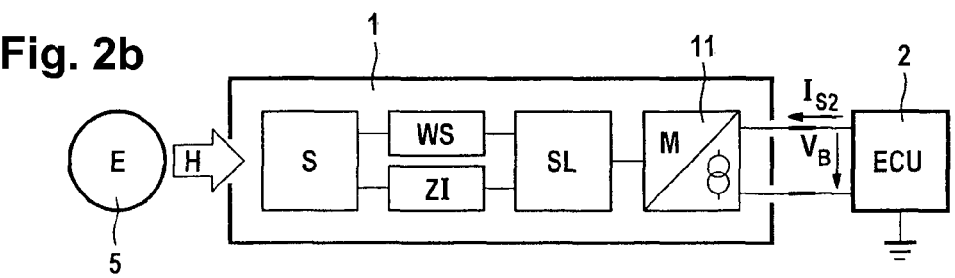

FIGS. 2a and 2b show the internal system construction of two typical known variants of active wheel rotational speed sensors with a 2-wire interface. In this case, FIG. 2a shows a wheel rotational speed sensor without additional functions. Wheel rotational speed sensor 1 comprises the magnetoresistive sensor element S in a chain with an electronic signal conditioning stage SC. The sensor element is coupled to the encoder via a magnetic field H. The encoder rotating at wheel rotational speed modulates the air gap field H with an incremental pattern containing the wheel rotational speed information. Sensor element S and the signal conditioning stage SC generate from this air gap field modulation a signal voltage for controlling a modulator stage M, which, for its part, controls a current source 11, such that the incremental pattern of the encoder is mapped as impressed signal current IS1.

FIG. 2b illustrates the construction of known wheel rotational speed sensors with additional functions. In contrast to the embodiment of FIG. 2a above. FIG. 2b shows that the signal conditioning stage is divided in two paths WS and ZI. The path WS serves for conditioning the wheel rotational speed information from the encoder signal, while ZI serves for separate conditioning of additional information items from the sensor/encoder interface. Such additional information items are by way of example direction of rotation and air gap size. In a signal stage SL, the signals conditioned by WS and ZI are processed and combined to form a control signal for the modulator stage M. The modulator stage M controls a current source 11, such that the protocol of wheel rotational speed and additional functions that is contained in the control signal is mapped as impressed signal current IS2. It is known to transmit data using 3-level protocols or PWM protocols (pulse width modulation).

Figure 3A:
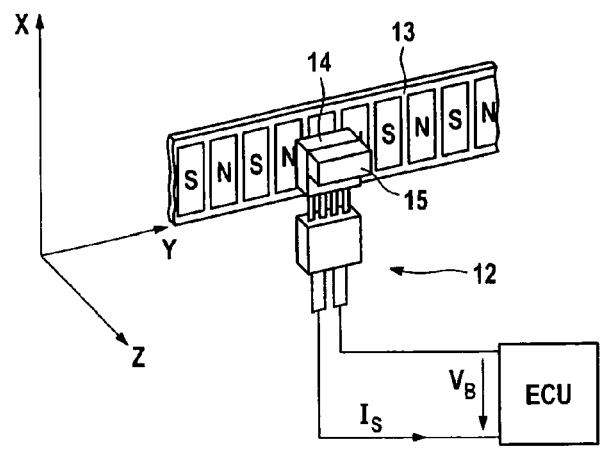
FIGS. 3a and 3b show the reference directions in the context of the arrangement for rotational speed detection.
Figure 3B:
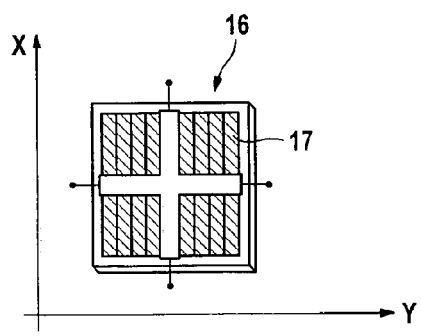

FIGS. 3a and 3b define for the examples shown in the figures, a system of Cartesian coordinates in relation to the encoder track and with respect to sensor module 12. FIG. 3a shows a magnetoresistive sensor module 12 of known type, which is constructed in accordance with the example according to FIG. 2a, in its geometrical orientation with respect to an alternately, permanently magnetized encoder track 13. The area of encoder track 13 lies in the XY plane and the encoder and thus the encoder track 13 move relative to the sensor element in the Y direction. Part 14 of the sensor element contains a bridge circuit 16 comprising four magnetoresistive permalloy Barber-pole resistors 17, as are illustrated in FIG. 3b. The plane of the resistive layers, likewise like that of the encoder, is oriented parallel to the XY plane.

FIGS. 4a and 4b elucidates and illustrates by way of example the location-dependent profile of the magnetic field lines of an alternately magnetized encoder. The latter can in this case be regarded as a rotationally symmetrical embodiment, the curvature of which is disregarded, or as a straight, bar-type embodiment. In this case, FIG. 4a shows the development of an encoder in the XYZ system of coordinates. The encoder track, and thus its surface, lies parallel to the XY plane and has a uniform sequence of alternating north/south poles in the Y direction. The field lines of the magnetic field generated by the encoder track run in the central region of the encoder (around X=0), essentially only in the YZ plane. That is to say that said field lines only have components in the Y direction and in the Z direction. With increasing distance between the magnetic field lines and the center line of the encoder in the Y direction, their emergence angles additionally incline in the X direction, that is to say have components in all three directions. Field lines which emerge laterally from the encoder track, by contrast, only have components in the X and Y directions. In other words the field lines run and rotate in the XY plane.

FIG. 4b illustrates the encoder track with the basic profile of its magnetic field distribution in front view and plan view. The circle with dot symbols denote emerging field lines and the circle with cross symbols denote entering field lines. The front view shows the directional diagram of the field lines at an interface (−x)–(x) with the field line H00 without an X component, the field lines H10, H20 with a small X component and the field line H30 with a large X component.

Figure 5A:
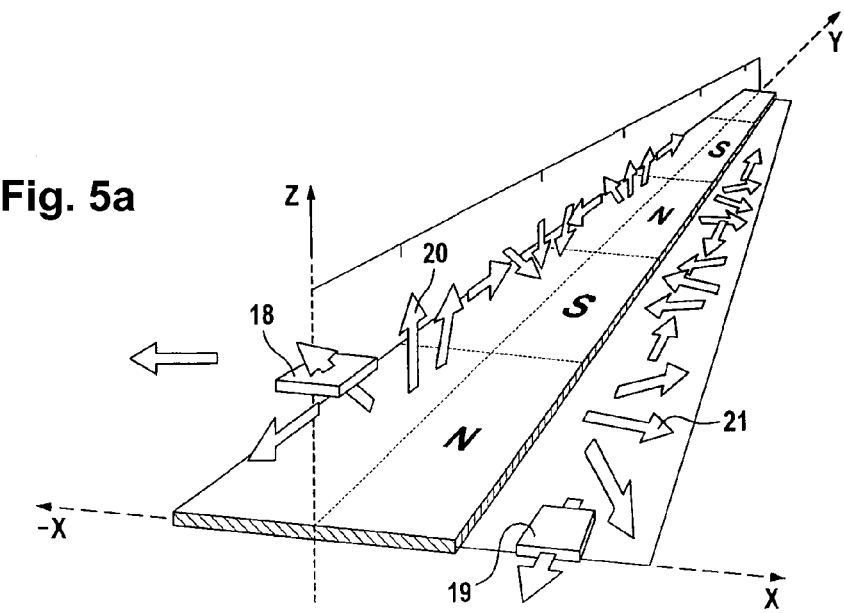
FIGS. 5a and 5b show different variants of measurement location and sensor orientation with regard to the encoder track.
Figure 5B:
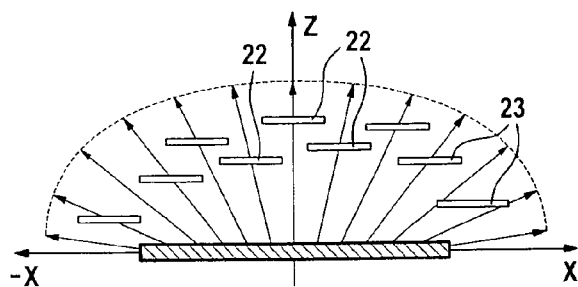

FIGS. 5a and 5b show by way of example an encoder track in accordance with FIGS. 4a and 4b in combination with two identically embodied magnetoresistive sensor-type area structures 18, 19 according to FIG. 3b, or the areas of two sensor elements, in parallel orientation with respect to the XY plane in two distinguished regions of the magnetic encoder field. In this case, area structure 18 is arranged essentially parallel to the encoder track above the center thereof and area structure 19 is arranged to the side of the encoder track and parallel to the encoder track surface. In the event of a relative movement between the encoder track and the sensor elements 18, 19 in the Y direction, sensor 18 reacts exclusively to the Y field strength component of the magnetic vector rotating in the YZ plane, whereas sensor 19 reacts both to the Y component and to the X component of the magnetic encoder field rotating in the XY plane.

FIG. 5b shows a diversity of possible local arrangements of sensor elements in relation to the encoder track, which can be regarded as mixed forms of the arrangements 18, 19. In the case of arrangements in the spatial region 22, the planes of the sensor element and of the rotating magnetic field vector are virtually perpendicular to one another. Arrangements of this type are used for example for field strength measurement and wheel rotational speed detection.

Figures 6A, 6B:
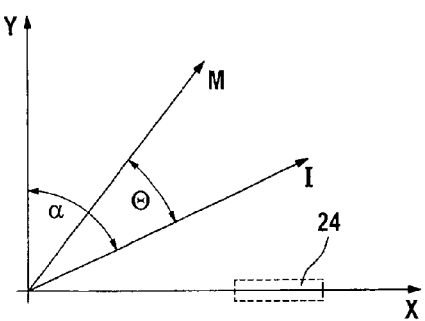
FIGS. 6a and 6b show physical relationships in field strength measurements in the Y direction.

Normally, in this case, mainly sensors with a linear characteristic curve profile are utilized in order to have the effect that the period of the sensor output signal maps the pole pitches of the encoder (tooth/gap or north/south pole) essentially in a ratio of 1:1. It is known that this is achieved for example if, according to FIG. 6b, an angular offset of α=45° is set between the current flow direction J through a magnetoresistive stripline 24 and the longitudinal axis (easy axis, predefined by the internal magnetic preferred direction) of said stripline and said longitudinal axis is simultaneously oriented in the direction of the X coordinate. The formula in FIG. 6a describes the relationship between the relative resistance change of an anisotropic magnetoresistive resistor and the external magnetic modulation. The magnetic modulation is taken to mean the ratio of the external magnetic field strength in the y direction to the anisotropy field strength.

Figure 7A:
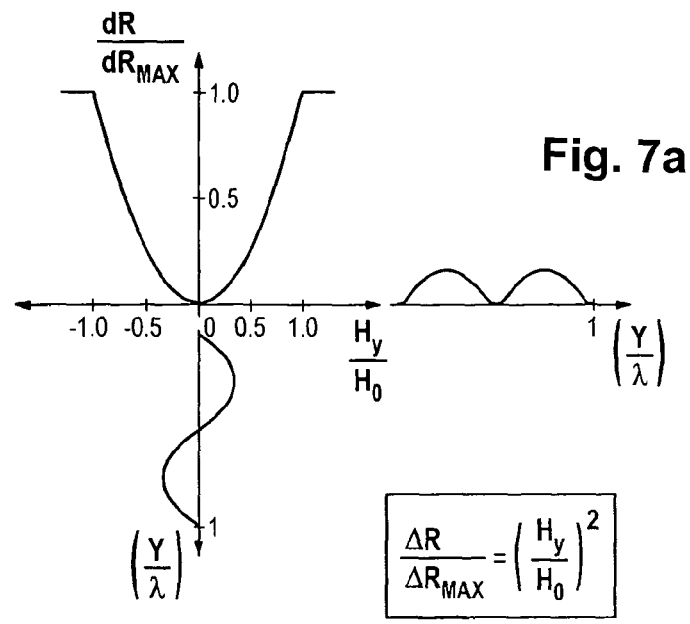
FIGS. 7a and 7b show different characteristic curves as a function of the strip orientation of sensor elements with regard to the encoder track.
Figure 7B:
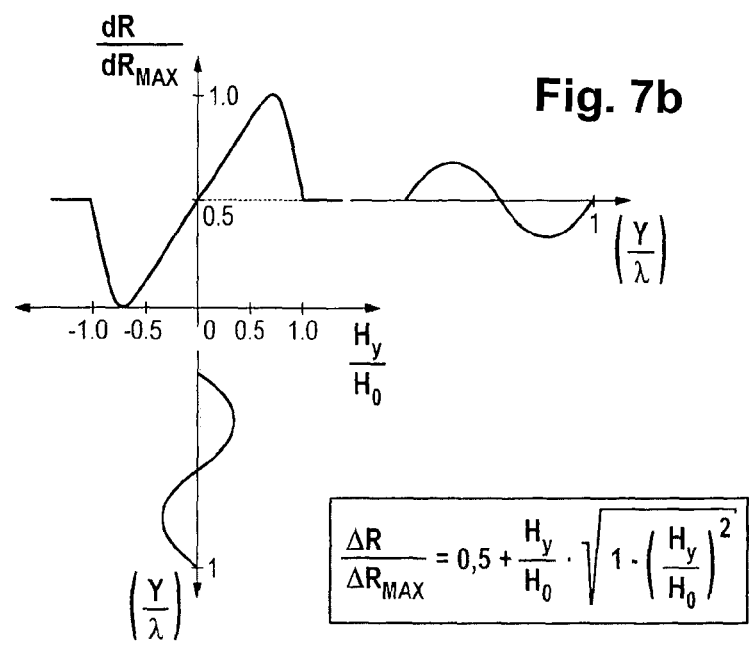
Figures 8A, 8B:
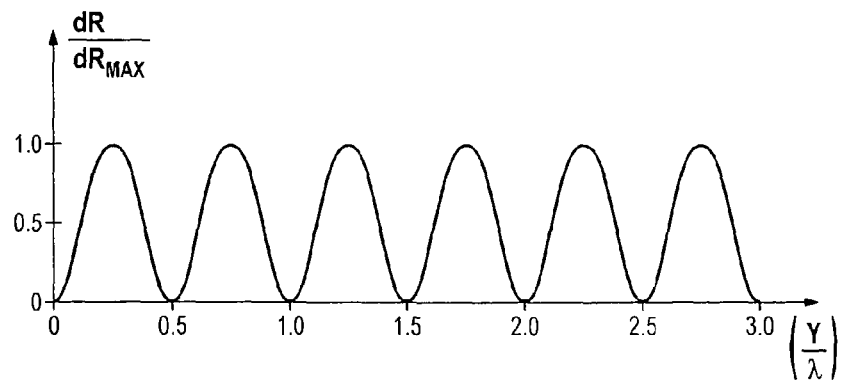
FIGS. 8a and 8b show the temporal profile of the output signal of a sensor element whose sensor area is oriented in such a way that a magnetic field rotates periodically with regard to both direction components of said sensor area.

The reference symbols hereinafter denote the following:
$dR/dRmax = \Delta R/\Delta Rmax$ = relative resistance change of a magnetoresistive stripline
$Hx, Hy$ = magnetic field components in X, Y direction
$H0$ = anisotropy field strength Hy/H0=magnetic modulation Y/λ=spatial shift along the Y axis relative to the magnetic wavelength λ (N/S pole pair) of the encoder α=current flow angle relative to the easy axis (preferably defined by way of the direction of the shape anisotropy) of the stripline Θ=angle between current flow and internal magnetization of the stripline FIG. 7b shows the sensor-type characteristic curve resulting in accordance with the formula from FIG. 6a for an angle α=45° and without a stabilization field (Hx=0 kA/m) and that it transfers the spatial frequency, meaning the periodic resistance change with regard to the pole pairs detected by the sensor in the course of a movement of the encoder and the angular changes in this regard in the internal magnetization, of the magnetic modulation (Hy/H0) into a frequency-identical resistance change dR/dRmax. This characteristic curve shows the within certain limits linear behavior of the sensor element. This behavior is often used for detecting the encoder rotation in wheel rotational speed sensors. Such a linear curve originating from the angle α=45° is often realized by Barber-pole structures. In this case, the current flows through the permalloy, which exhibits a relatively large resistance, alternately through metal strips of high conductivity, said metal strips being fitted obliquely at an angle of 45° on the stripline. The current then flows via the path of least resistance, that is to say a shortest possible path via the likewise oblique strips of permalloy, whereby a preferred direction of the current flow of almost 45° is achieved, in contrast to the path of the current through the metal strips. For such a sensor element with an angle α=45° in position 19 in accordance with FIG. 5a, the effective plane of which lies in the plane of the rotating field strength vector (XY plane), a profile of the resistance change arises which can be described in a simplified manner according to FIG. 8a, the spatial frequency of the encoder field being transferred with doubled frequency, as is illustrated in FIG. 8b. This positioning of such a sensor element with described frequency-doubling properties with regard to the sensor element output signal is comparable to an arrangement for angle measurements.

If a sensor element is operated in spatial regions 23 in accordance with FIG. 5b, it can happen, therefore, that the intended linear transfer of the spatial frequency of the encoder field is disturbed by superposition of signal components with doubled frequency. An excessively large Hx component of the rotating magnetic field vector, in particular an Hx component acting from outside the arrangement as a disturbance, can simultaneously compensate for the Hx supporting field strength of the additional permanent magnet 15, illustrated in FIG. 3a, that is usually used for stabilizing a characteristic curve according to FIG. 7b, to an extent such that periodic abrupt and/or continuous mirrorings of said characteristic curve occur, which likewise effects an undesirable disturbance, in particular a doubling, of the output signal of the sensor element with regard to the detected encoder movements. This operation or such a behavior of the sensor element output signals is also referred to as "flipping". Combinations and superpositions of different disturbances mentioned, in particular those referred to as "flipping" can also occur. The occurrence of such a frequency doubling on account of one or on account of a combination of the causes described is manifested for example when:

the encoder has only one narrow magnetic reading track, has a strong magnetization, the sensor module is positioned relatively far from the center of the reading track, the sensor module is positioned very close to the encoder surface.

Technically, all unintentional frequency doubling operations, in particular for the wheel rotational speed detection, are regarded as disturbing and undesirable.

Figure 9:
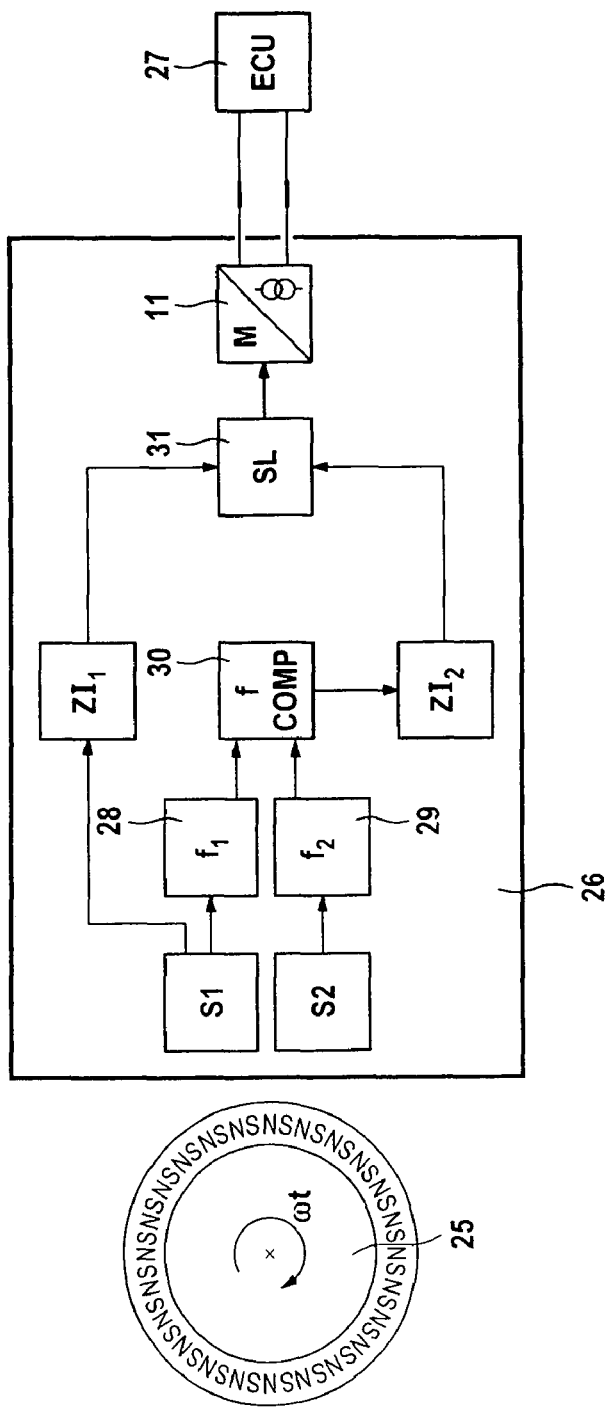
FIG. 9 shows an exemplary arrangement for intrinsically safe rotational speed detection.

FIG. 9 shows an exemplary arrangement for intrinsically safe wheel rotational speed detection, comprising an encoder 25 and the intrinsically safe sensor 26, which is electrically conductively connected to ECU 27 via a 2-wire line. The sensor 26 contains two magnetoresistive, in particular anisotropically magnetoresistive, sensor elements S1 and S2, which are magnetically coupled to encoder 25. A wheel rotational speed signal is conditioned from the output signals of the sensor elements S1, S2 by means of an associated signal conditioning stage 28, 29. Sensor elements S1, S2 and signal conditioning stages 28, 29 are respectively part of two separate signal paths. A primary measuring signal path comprising sensor element S1 and signal conditioning stage 28 and an observing signal path comprising sensor element S2 and signal conditioning stage 29 exist in this case. For the exemplary case of a wheel rotational speed sensor of the type in accordance with FIG. 2b, as is illustrated here as a general example, from sensor element S1 an additional information item ZI1 is derived which, in terms of its functionality, corresponds to that described under ZI in FIG. 2b. The signal frequencies of the signal conditioning stages 28 and 29 are compared in respect of their matching in a comparator, here for example in a frequency comparator stage 30. Comparator stage 30 generates as result protocol a status bit with regard to the matching or non-matching of the signal frequencies. It is provided, for example, that additional diagnostic information is derived from the signal comparison and transmitted. The signal of the comparator stage is fed to signal logic 31. Signal logic 31, in particular embodied as an electrical circuit, generates a signal protocol containing the information of the frequency comparator 30 and also, in particular additionally, additional information items. By means of the modulator M and the current source 11, the signal protocol is then mapped as signal current pattern and transmitted to ECU 27.

Figures 10A, 10B, 10C:
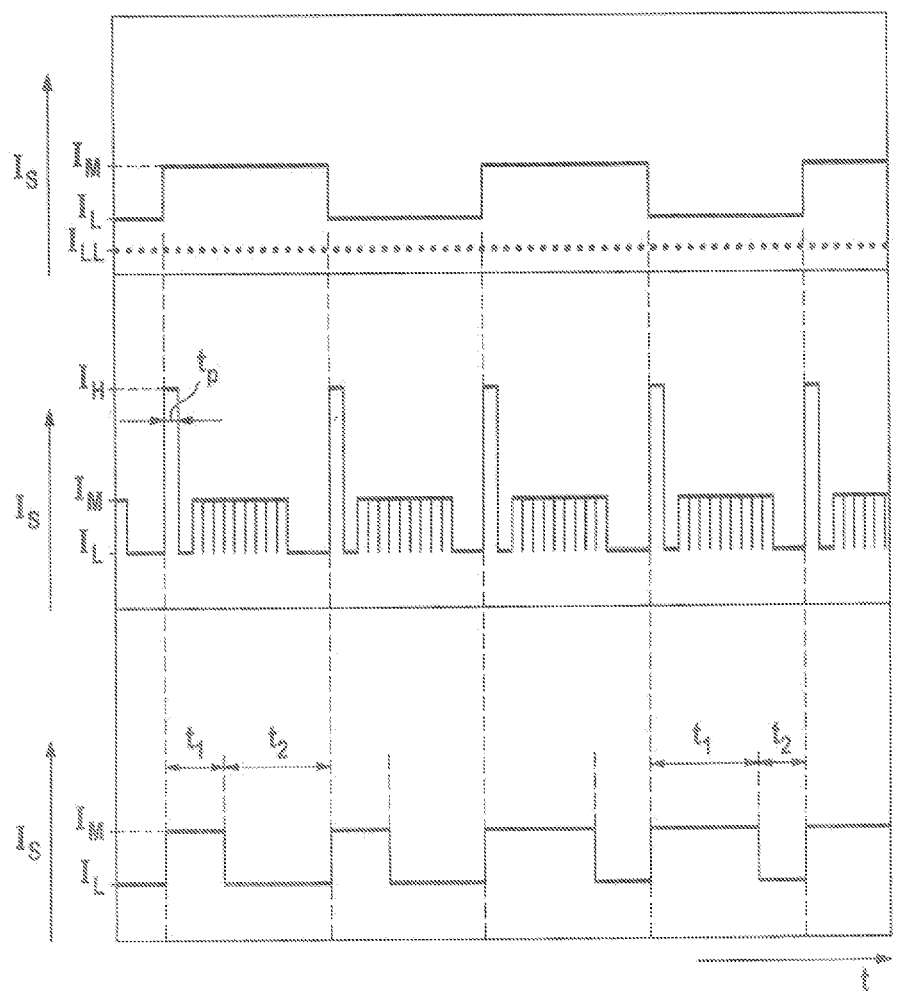
FIGS. 10a, 10b, and 10c show different signal protocols.

FIGS. 10a, 10b and 10c show present-day conventional signal protocols and possibilities for transmitting diagnostic information with regard to a frequency disturbance to the ECU.

FIG. 10a shows the 2-level protocol, which has become established as a standard for unidirectional wheel rotational speed detection. Here, as an example, the state of the disturbing frequency doubling is revealed to the ECU by a constant quiescent level.

FIG. 10b shows a 3-level protocol, which is likewise used by the automotive industry. While the rotational speed information is identified by means of the levels Jh, various additional information items such as direction of rotation, air gap size are encoded in a serial sequence of bits in the level range Im and Jl. There is the advantageous possibility of utilizing one of said bits for encoding the doubling diagnosis. In conjunction with the air gap diagnosis already present it is possible to supervise a significantly improved installation safety.

FIG. 10c shows a PWM protocol, which is likewise utilized by the automotive industry. Here the doubling state can be revealed to the ECU by means of a specific pulse width ratio.

With regard to FIG. 9, the signal path of S1, the primary measuring signal path, is formed with a mapping of the encoder frequency of 1:1 and the signal path of S2, the observing signal path, is formed with a mapping of the encoder frequency of 2:1, that is to say a frequency doubling.

In an exemplary embodiment of the arrangement according to the invention, the stages 28, 29, 30, 31, M, 11 are formed as an integrated electronic circuit and the sensor elements S1 and S2, utilizing the anisotropic magnetoresistive effect, are formed as a combination of striplines composed of permalloy to some or the totality of which the supporting field of a co-integrated permanent magnet is applied. Sensor elements S1 and S2 can be produced such that they are co-integrated on a chip plane. Given a suitable arrangement of the sensor-type striplines, an impermissible positional shift of the sensor element S1 with respect to the encoder 5, 25 can be diagnostically identified from internal partial signals of the sensor element S2. It is preferred for this additional information likewise to be transmitted to the ECU, for example utilizing a protocol in accordance with FIG. 10b.

Figure 11A:
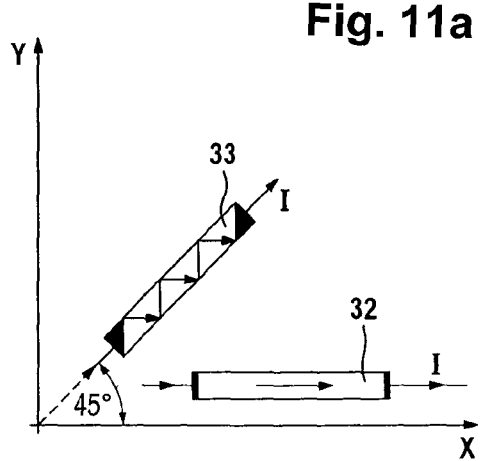
FIG. 11a and 11b show equivalent structures of sensor elements with regard to the orientation of their striplines with respect to the encoder track.
Figure 11B:
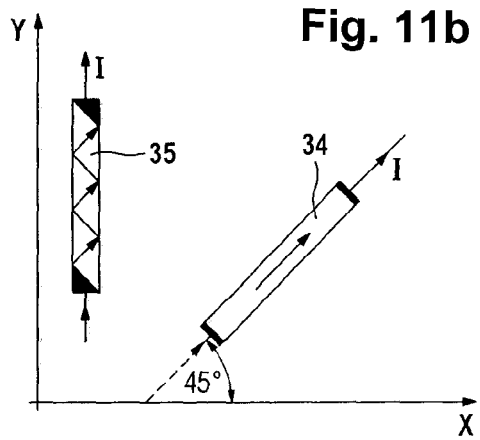

Half- or full-bridge combinations of striplines having a linearized characteristic curve in accordance with FIG. 7b are preferably utilized for the exemplary realization of the sensor structure of the sensor element S1, that is to say of the sensor element of the primary measuring signal path. According to the common system of reference coordinates according to FIG. 3a, in this case, according to FIG. 11b, a stripline without Barber-poles 34 which is oriented at 45° with regard to the direction of movement of the encoder 5, 25 and alternatively a stripline oriented parallel with regard to the direction of movement of the encoder 5, 25 with Barber-poles 35 are equivalent in terms of their functionality. The same applies to a mirroring of said striplines about the X axis. A rotation of a stripline through 90° with regard to the origin of the system of coordinates, the direction of movement of the encoder 5, 25 running along the Y axis, also does not change in particular the functionality of the stripline. Half- or full-bridge combinations of striplines having a quadratic characteristic curve in accordance with FIG. 7a which arise for α=90° and Hx=0 kA/m (no stabilization field) are preferably utilized for the exemplary realization of the sensor structure of the sensor element S2, that is to say of the sensor element of the observing signal path. FIG. 7a shows that the spatial frequency of the magnetic modulation (Hy/H0) is transferred into a resistance change dR/dRmax with doubled frequency. This signal profile cannot be disturbed either by flipping or by the influences discussed with regard to FIGS. 8a and 8b and thus preferably meets the requirements for an observing signal path. According to the common system of reference coordinates in accordance with FIG. 3a, in this case, according to FIG. 11a, a stripline without Barber-poles 32 which is oriented at 90° with regard to the direction of movement of the encoder 5, 25 and a stripline with Barber-poles 33 which is oriented at 45° with regard to the direction of movement of the encoder 5, 25 are equivalent in terms of their functionality. The same applies to mirroring these strips about the X axis. A rotation of a stripline through 90° with regard to the origin of the system of coordinates, the direction of movement of the encoder 5, 25 running along the Y axis, also does not change in particular the functionality of the stripline.

Figure 12B:
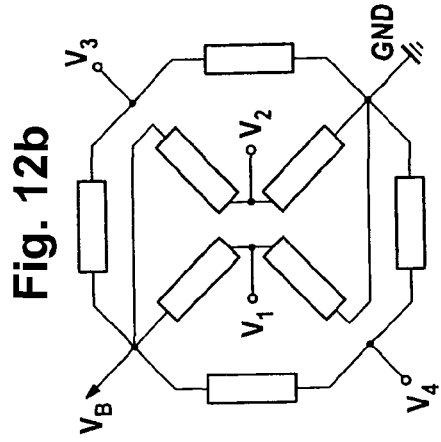
FIGS. 12a, 12b, 12c and 12d show embodiments with regard to the arrangement and embodiment of the striplines of sensor elements.
Figure 12D:
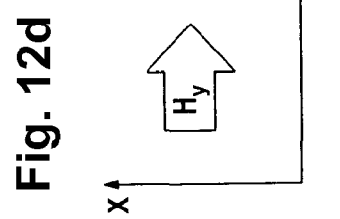
Figure 12A:
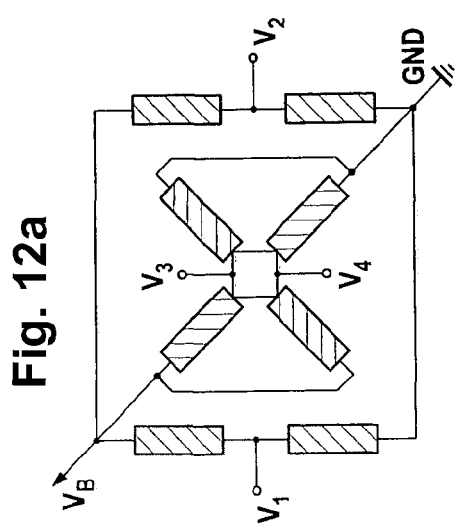
Figure 12C:
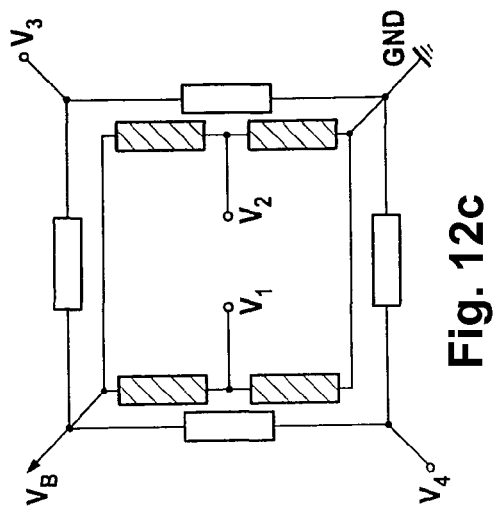

FIGS. 12a, 12b and 12c show three exemplary embodiments of bridge combinations for realizing the sensor structures of the sensor elements S1, S2. The in each case 8 magnetoresistive resistors are stylized as individual strips (striplines) in order to simultaneously identify the required strip orientation relative to the system of coordinates in FIG. 12d. A hatching of the striplines identifies an embodiment with Barber-poles, and a stripline without hatching identifies an embodiment without Barber-poles. The voltage or current supply of the bridges is effected in each case via the terminals VB, GND. The signal of the primary measuring signal path comprising sensor element S1 is tapped off in each case at the terminals V1, V2. The signal of the observing signal path comprising sensor element S2 with doubling frequency is tapped off in each case at the terminals V3, V4. FIG. 12a shows a configuration exclusively using Barber-pole strips. FIG. 12b shows a configuration exclusively using striplines without Barber-poles. FIG. 12c shows a mixed configuration of striplines with and without Barber-poles. Each of these structures is backed by a permanent supporting magnet (not illustrated here) with polarization in the direction of the X axis. The magnetic field strength of the supporting magnet is chosen in such a way that the sensor-type properties explained with respect to FIGS. 7a and 7b are influenced only insignificantly. These bridge structures are operated in plane-parallel fashion with respect to the encoder track with orthogonal orientation with respect to the common XYZ reference system. In FIG. 12, by way of example, the amplitudes of the two respective half-bridges of the observing path can be tapped off at the terminals V3 and V4.

A further embodiment proposal is based on a modified application of MR angle or displacement sensors. Normally, without the application of a supporting magnet, for the purpose of the angle/length measurement, the plane of said sensors is oriented perpendicular relative to the surface of a length scale, embodied as a magnetic encoder, into the YZ plane (that is to say rotated through 90° relative to 18 from FIG. 5) and the rotation of the field vector is evaluated in accordance with FIG. 8. It is proposed by way of example to operate such an element with a supporting magnet polarized in the X direction in parallel orientation with respect to the encoder track (that is to say like 18 from FIG. 5) and to utilize the sin bridge for S1 and the cos bridge for S2, in which case the strip orientations have to satisfy the coordinate orientations described.

The invention claimed is:

1. A method for increasing intrinsic safety of an arrangement for detecting movements of a body, the arrangement comprising a magnetic encoder (5, 25) and a sensor (26), wherein the sensor (26) has at least two sensor elements (S1, S2) which are magnetically coupled to the magnetic encoder (5, 25), the method comprising:

comparing output signals from at least two separate signal paths (S1, f1; S2, f2), wherein the at least two separate signal paths (S1,f1;S2,f2) includes at least one primary measuring signal path (S1,f1) and at least one observing signal path (S2,f2), each of the two separate signal paths (S1,f1;S2,f2) corresponds to at least one of the sensor elements (S1, S2), wherein the at least one primary measuring signal path (S1, f1) is constructed such that a temporal profile of the output signal from the at least one primary measuring signal path (S1,f1) during normal operation has patterns essentially corresponding to a relative speed between the sensor and a pole pair of the magnetic encoder that are detected by said sensor that represent a wheel rotational speed, and the at least one observing signal path (S2, f2) is constructed such that a temporal profile of the output signal from the at least one observing signal path (S2,f2) includes patterns, an occurrence of said patterns of the at least one observing signal path essentially corresponding to double the relative speed between the sensor and the pole pair of the magnetic encoder detected by said sensor that represent double the wheel rotational speed, wherein the comparing output signals includes comparing output signals from the at least one primary measuring signal path (S1, f1) and the at least one observing signal path (S2, f2) with one another in a comparator (30), with the comparator (30) being designed such that, responsive to the output signals from the at least one primary measuring signal path and from the at least one observing signal path essentially matching, a comparison result is produced indicative of an erroneous function of the at least one primary measuring signal path (S1, f1); and transmitting the comparison result to an electronic control unit (ECU).

2. An arrangement for intrinsically safe detection of movement of a body comprising:

a magnetic encoder (5, 25); and a sensor (26) having at least two sensor elements (S1,S2), wherein the magnetic encoder (5, 25) moves with the body and is magnetically coupled to the at least two sensor elements (S1, S2) of the sensor (26) via a magnetic air gap, wherein the sensor (26) has at least two mutually separate signal paths (S1, f1; S2, f2), wherein each of the at least two mutually separate signal paths (S1,f1;S2,f2) include at least one of the at least two sensor elements (S1, S2) and a signal conditioning stage (28, 29), the at least two mutually separate signal paths (S1,f1;S2,f2) including at least one primary measuring signal path (S1, f1) and at least one observing signal path (S2,f2), with the at least one primary measuring signal path (S1,f1) having at least one output signal during normal operation having a temporal profile that represents a frequency of movement of the magnetic encoder that during normal operation has patterns essentially corresponding to a relative speed between the sensor (26) and pole pairs of the magnetic encoder (5, 25) which are detected by said sensor, and the at least one observing signal path (S2, f2) having at least one output signal that represents a doubled frequency of the magnetic encoder movement and that a temporal profile of the at least one output signal of the at least one observing signal path (S2,f2) during normal operation includes patterns essentially corresponding to double the relative speed between the sensor (26) and the pole pairs of the encoder (5, 25) which are detected by said sensor, wherein the output signals of the at least one primary measuring signal path (S1, f1) and of the at least one observing signal path (S2, f2) are compared with one another in a comparator (30), with the comparator (30) being designed such that, responsive to the output signals of the at least one primary measuring signal path and of the observing signal path essentially matching, an erroneous function of the primary measuring signal path (S1, f1) is identified by an electronic control unit receiving one or more output signals from the comparator (30).

3. The arrangement as claimed in claim 2, wherein the at least one output signal of the at least one sensor element (S1, S2) of the at least one primary measuring signal path (S1, f1) provides, information about the frequency of the encoder movements including additional information items (ZI1) comprising at least one of a direction of rotation and an air gap size.

4. The arrangement as claimed in claim 2, wherein the output signals of the at least one primary measuring signal path (S1, f1) and of the at least one observing signal path (S2,f2) are compared with one another in the comparator (30) according to one of a continuous comparison and a comparison at defined points in time.

5. The arrangement as claimed in claim 2, wherein that the magnetic encoder (5, 25) has a permanently magnetized encoder track comprising alternating magnetic north-south poles, and the sensor elements (S1, S2) utilize a magnetoresistive effect and are formed as a combination of striplines composed of permalloy.

6. The arrangement as claimed in claim 2, wherein the magnetic encoder includes an encoder track (13) and wherein planes of the at least two sensor elements (14, S1, S2) are arranged essentially parallel to a plane of the encoder track (13) (XY plane).

7. The arrangement as claimed in claim 2, wherein the at least one sensor element (S1) in the at least one primary measuring signal path is a half- or full-bridge combination of striplines, wherein if the striplines have no Barber-poles the striplines are oriented at an angle of essentially +45° or −45° with respect to a direction of movement of the encoder (Y axis), and in a corresponding orientation with regard to the direction of movement of the encoder (Y axis), or if the striplines are provided with Barber-poles they are oriented essentially perpendicular or parallel to the direction of movement of the encoder (Y axis).

8. The arrangement as claimed in claim 2, wherein the at least one sensor element (S2) in the at least one observing signal path is a half- or full-bridge combination of striplines, wherein if the striplines have no Barber-poles the striplines are oriented essentially parallel or perpendicular to a direction of movement of the encoder (Y axis), or if the striplines are provided with Barber-poles they are oriented at an angle of essentially +45° or −45° with respect to the direction of movement of the encoder (Y axis), and are in a corresponding orientation with regard to the direction of movement of the encoder (Y axis).

9. The arrangement as claimed in of claim 2, wherein at least one of the sensor elements (S1, S2) is provided with a permanent magnet or a coil for forming a biasing magnetic field.

10. The arrangement as claimed in claim 2, wherein the at least two sensor elements (S1, S2) are integrated on a common chip.

* * * * *